(12) United States Patent
Suzuki et al.

(10) Patent No.: US 9,780,559 B2
(45) Date of Patent: Oct. 3, 2017

(54) ESD PROTECTION DEVICE

(71) Applicant: TDK CORPORATION, Tokyo (JP)

(72) Inventors: Shingo Suzuki, Tokyo (JP); Kensaku Asakura, Tokyo (JP); Takahiro Fujimori, Tokyo (JP); Kiyoshi Hatanaka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 211 days.

(21) Appl. No.: 14/776,937

(22) PCT Filed: Mar. 6, 2014

(86) PCT No.: PCT/JP2014/055732
§ 371 (c)(1),
(2) Date: Sep. 15, 2015

(87) PCT Pub. No.: WO2014/141988
PCT Pub. Date: Sep. 18, 2014

(65) Prior Publication Data
US 2016/0028227 A1     Jan. 28, 2016

(30) Foreign Application Priority Data
Mar. 15, 2013   (JP) .................................. 2013-053222

(51) Int. Cl.
*H01T 1/22* (2006.01)
*H01T 1/20* (2006.01)
(Continued)

(52) U.S. Cl.
CPC ............... *H02H 9/044* (2013.01); *H01T 1/22* (2013.01); *H01T 4/12* (2013.01); *H02H 9/06* (2013.01)

(58) Field of Classification Search
CPC ..... H01L 23/60; H01L 27/00; H01L 27/0248; H01L 27/0288; H01L 27/101;
(Continued)

(56) References Cited

U.S. PATENT DOCUMENTS 7,633,735 B2* 12/2009 Urakawa .................. H01T 4/12
361/112
2008/0049370 A1   2/2008 Adachi et al.
(Continued)

FOREIGN PATENT DOCUMENTS

EP          2270936 A1      1/2011
JP          53-122744    * 10/1978
(Continued)

OTHER PUBLICATIONS

Jun. 3, 2014 Written Opinion issued in International Patent Application No. PCT/JP2014/055732.
(Continued)

*Primary Examiner* — Thienvu Tran
*Assistant Examiner* — Nicolas Bellido
(74) *Attorney, Agent, or Firm* — Oliff PLC (57) ABSTRACT

The present invention relates to an electrostatic discharge protection device provided with an insulating laminate containing a first and a second insulating substrate stacked there, a first and a second discharge electrode disposed inside the insulating laminate, a first insulating layer having glass disposed on the side surfaces of the first and the second discharge electrodes, a second insulating layer having glass disposed on the main surfaces of the first and the second discharge electrodes, and an discharge inducing section disposed between the side surfaces of the first and the second discharge electrode, wherein, the distance between the side surfaces of the first and the second discharge electrodes was set as ΔG and the thickness of the second insulating layer
(Continued)

was set as ΔZ which two adapt to inequations 3 μm≤ΔZ≤35 μm and ΔG≤40 μm.

2 Claims, 3 Drawing Sheets

(51) Int. Cl.
*H02H 9/04* (2006.01)
*H01T 4/12* (2006.01)
*H02H 9/06* (2006.01)

(58) Field of Classification Search
CPC ......... H01L 27/0292; H01T 1/20; H01T 1/22; H01T 4/12; H01T 4/10; H01T 4/08; H02H 9/00; H02H 9/06; H02H 9/044; H02H 9/04; H05F 3/04; H05K 1/026; H05K 2201/0272; H05K 2201/09736; H05K 2201/10196; H05K 2201/0175; H05K 2203/107; H05K 1/0259; H01C 7/1006; H01C 7/123; H01C 7/105; H01C 1/148
USPC .......................................... 361/56, 220, 112
See application file for complete search history.

(56) References Cited

U.S. PATENT DOCUMENTS

| | | | | |
|---|---|---|---|---|
| 2010/0309595 | A1* | 12/2010 | Adachi | ..................... H01T 1/20 361/56 |
| 2011/0222203 | A1* | 9/2011 | Adachi | ..................... H01T 1/20 361/220 |
| 2012/0300355 | A1* | 11/2012 | Umeda | ................ H05K 9/0067 361/220 |
| 2013/0141826 | A1 | 6/2013 | Asakura et al. | |

FOREIGN PATENT DOCUMENTS

| | | | | |
|---|---|---|---|---|
| JP | 2006-049064 A | 2/2006 | | |
| JP | 2009-301819 A | 12/2009 | | |
| JP | 2011-124102 A | 6/2011 | | |
| JP | WO 2011096335 A1 * | 8/2011 | ............... | H01T 4/12 |
| TW | 2012-30570 A | 7/2012 | | |

OTHER PUBLICATIONS

Jun. 3, 2014 International Search Report issued in International Patent Application No. PCT/JP2014/055732.

* cited by examiner

ESD PROTECTION DEVICE

The present invention relates to an electrostatic discharge (ESD) protection device, especially an ESD protection device useful in the application of a high-speed transmission system or the integration with common mode filters.

BACKGROUND

Recently, the downsizing and performance improvement of the electronic devices are under rapid development. Also, the improvement of the transmission speed and the lowering of driving voltage in a circuit component in use progress remarkably as seen in the high-speed transmission systems such as the antenna circuit in the cell phone, the RF module, USB 2.0, and USB 3.0, S-ATA2, HDMI (Registered Trademark) or the like. On the contrary, with the downsizing of the electronic device or the lowering of driving voltage of the circuit component, the breakdown voltage of the electronic components which are used in the electronic devices decreases. In this respect, to protect the electronic components from overvoltage becomes an important technical subject, for example, to protect the electronic components against the electrostatic pulses generated when the human body is brought into contact with the terminals of an electronic device.

In the past, in order to protect the electronic components from such electrostatic pulses, a method of providing a laminated varistor between the ground and a line to be subjected to static electricity has generally been used. However, the laminated varistor usually has a relatively high electrostatic capacity which is the main cause for the deteriorated signal quality when the laminated varistor is used in the high-speed transmission system. In addition, an ESD protection device having a large electrostatic capacity cannot be used in an antenna circuit or an RF module. In this respect, an ESD protection device with a small electrostatic capacity is required to be developed which is applicable to the high-speed transmission system.

An ESD protection device has been suggested as the ESD protection device having a low electrostatic capacity which has two separately and oppositely disposed electrodes between which two a composite of a conductive inorganic material and an insulating inorganic material is arranged as a discharge inducing section. Similar to the laminated varistor, such an ESD protection device is disposed between the ground and a line to be subjected to static electricity. If a much too high voltage is applied, discharge will occur between the electrodes of the ESD protection device and then the static electricity will be introduced into the ground side.

Such an ESD protection device provided with the gap typed electrodes possesses characteristics such as a high insulation resistance, a small electrostatic capacity and a good responsiveness. In another respect, a problem rises that the electrodes and the conductive inorganic material inside the discharge inducing section will agglutinate due to the heat or stress generated during the discharge process to cause a short-circuiting.

The technique disclosed in, for example, Patent Document 1 has been proposed as one for inhibiting the short-circuiting caused by the discharge. Patent Document 1 has disclosed an ESD protection device characterized in that the oxides of the metal such as aluminium or magnesium are attached to the surface of discharge electrode in a gap typed discharge element containing a pair of discharge electrodes oppositely disposed in a hollow space. With such a configuration, as the oxide attached to the discharge electrode is the oxide with a high insulation resistance, the short-circuiting between the oppositely disposed electrodes can be prevented from happening and the durability against the repeatedly applied static electricity can be improved.

PATENT DOCUMENT

Patent Document 1: JP-A-2009-301819

SUMMARY

However, even if the metallic oxides disclosed in Patent Document 1 are attached to the discharge electrodes, they will be exposed to the high temperature accompanying the impact during the repeated uses so that they are likely to fall off or diffuse. In addition, the metallic oxides which are the insulators provide an effect on increasing the dielectric strength when the discharge occurs. When part of the metallic oxides is attached to the discharge electrodes, a problem rises that the discharge properties will fluctuate.

The present invention is made in view of the situations mentioned above and aims to provide an ESD protection device that is excellent in durability against repeated uses and has decreased fluctuation in discharge properties.

In order to solve the technical problems mentioned above, the ESD protection device of the present invention is characterized in that it is provided with an insulating laminate, a first and a second discharge electrodes, a first insulating layer, a second insulating layer and a discharge inducing section. In particular, the insulating laminate contains a first and a second insulating substrates laminated there. The first and second discharge electrodes are disposed between the first and the second insulating substrates and each at least has a side surface and a main surface, and these two discharge electrodes are disposed in such a manner that said side surface of the first discharge electrode is opposite to said side surface of the second discharge electrode. The first insulating layer is disposed on said side surface of the first and the second discharge electrode and contains glass. The second insulating layer is disposed on said main surface of the first and the second discharge electrodes and contains glass. The discharge inducing section is disposed between said side surface of the first discharge electrode and said side surface of the second discharge electrode via the first insulating layer, and at least part of the discharge inducing section is disposed to overlap with the main surfaces of the first and second discharge electrodes via the second insulating layer. The discharge inducing section is composed of a porous substance in which the microscopic voids discontinuously distribute and contains a hollow construction having at least one hollow space. When the distance between said side surface of the first discharge electrode and said side surface of the second discharge electrode is set as $\Delta G$, it adapts to the in equation of $\Delta G \leq 40$ μm. Further, when the thickness of the second insulating layer is set as $\Delta Z$, it adapts to the in equation of $3\ \mu m \leq \Delta Z \leq 35\ \mu m$.

After assessing the properties of the ESD protection device with such a configuration, the present inventors determine that the durability against repeated uses has been improved and the fluctuation in the discharge properties has decreased. The underlying mechanisms for providing such effects are presumed as follows.

In particular, the ESD protection device with the configuration mentioned above is provided with the first insulating layers that are disposed to face said side surfaces of the oppositely arranged discharge electrodes and contain glass and also the second insulating layers that are disposed on said main surfaces of the first and second discharge electrodes and contain glass. In this way, the melt from the discharge inducing section generated by the discharge process is prevented from contacting the oppositely disposed discharge electrodes.

In addition, the discharge inducing section of the present invention forms in a porous manner where microscopic voids discontinuously distribute. As such, minute gaps (microscopic voids) are formed in the discharge inducing portion. Thus, even if the discharge inducing section is discharged and melted, the microscopic voids are able to inhibit the short-circuiting between the opposing electrodes caused by the melts. In addition, the microscopic voids buffer the high pressure derived from the shock during the discharge process and also prevents the interior of the device from being disrupted.

Further, the discharge inducing section of the present invention is provided with at least one hollow space so that repeated discharges will occur inside the hollow space. In addition, even if discharge occurs on the surface of the hollow space, the microscopic voids of the discharge inducing section which are contained outside the surface of the hollow space can inhibit the short-circuiting between the opposing electrodes caused by the generation of melts. Further, the high pressure derived from the shock during the discharge process is buffered by the volume of the microscopic voids and the interior of the device is prevented from being disrupted.

It is predicted that the discharge inducing section is more likely than the insulating layer containing glass to have pores due to the disruption during the discharge process. If the insulating layer containing glass is disposed between the discharge inducing section and each of the opposing electrodes, the electrical insulation can be kept even if repeated tests are applied to the opposing electrodes.

If the discharge electrode of the present invention has a relatively thin thickness, the discharge electrode will be melted and the durability against repeated uses will deteriorate. Further, as the discharge electrodes move towards the outer electrodes, the peak voltage will increase.

In the present invention, the distance between said side surfaces of the oppositely disposed discharge electrodes (i.e., the gap distance) $\Delta G$ is set to be equal to or narrower than 40 μm. If the desired discharge properties are to be considered, $\Delta G$ preferably ranges from 0.1 to 40 μm. From the viewpoint of further decreasing peak voltage, $\Delta G$ is more preferably 5 to 40 μm. When $\Delta G$ is less than 5 μm, the IR at the initial stage tends to decrease. If $\Delta G$ is more than 40 μm, the peak voltage will increase and no sufficient effect on ESD protection will be provided in practice.

In the ESD protection device of the present invention, each of the pair of discharge electrodes formed inside the insulating laminate which is provided with the first and second insulating substrates at least contain a side surface and a main surface, and the first insulating layer containing glass is disposed on said side surfaces of the discharge electrodes whose said side surfaces are opposite to each other. In this way, the conductive inorganic material in the electrode can be prevented from flowing to the discharge inducing section, wherein the flow of the conductive inorganic material is caused by the discharge. Further, the adhesion of the insulating layer to the discharge electrodes can be improved by containing glass in the insulating layer. Thus, the falling off and the peeling off of the insulating layers from the discharge electrodes due to the shock derived from heat or stress accompanying discharge can be inhibited. As a result, it is predicted that the short-circuiting between the discharge electrodes can be inhibited during repeated uses and the durability can be improved.

In order to improve the durability against repeated uses in the mentioned ESD protection device, it is necessary to dispose the first insulating layer on at least part of the pair of the discharge electrodes. Thereby, the short-circuiting caused by the melts generated between the discharge electrodes due to the disruption to the surrounding of the discharge electrodes caused by the repeated discharge can be prevented. Therefore, an ESD protection device can be provided that is excellent in durability against repeated uses.

The discharge inducing section of the present invention is composed of a porous substance where microscopic voids discontinuously distribute, so the damage brought by the shock during the discharge process will involve not only part of the discharge inducing section between the discharge electrodes but also the other surrounding part of the discharge inducing section. In this respect, when the second insulating layer is disposed between the discharge electrode and the discharge inducing section, the surroundings of the discharge electrodes can be prevented from generating melts. In addition, when the thickness of the second insulating layer is set as $\Delta Z$, then 3 μm≤$\Delta Z$≤35 μm. When the thickness $\Delta Z$ of the second insulating layer is thinner than 3 μm, the short-circuiting between the melts and the discharge electrodes cannot be sufficiently prevented. On the other hand, when the thickness $\Delta Z$ of the second insulating layer is thicker than 35 μm, the construction defect will frequently occur around the second insulating layer and the fluctuation in electrical properties will increase.

With the configuration of the ESD protection device mentioned above, the short-circuiting due to the melts generated in the discharge inducing section upon repeated uses can be prevented. In this respect, an ESD protection device excellent in the durability against repeated uses can be provided.

If the fluctuation in electrical properties is to be inhibited, the discharge inducing section preferably has a shape that protrudes to the first insulating substrate and the second insulating substrate of the discharge electrodes.

In particular, if the discharge inducing section only protrudes to either the first insulating substrate or the second insulating substrate, intensity variation of electric field may happen to the corners of the electrodes where the electric field is concentrated. Therefore, if the discharge inducing section has a shape protruding to both the first insulating substrate and the second insulating substrate, the fluctuation in discharge properties can be further inhibited.

According to the present invention, an ESD protection device with an improved durability against repeated uses can be provided.

DETAILED DESCRIPTION OF EMBODIMENTS

Hereinafter, the embodiments of the present invention will be described with reference to the drawings. The same reference number is used for the same element, and the repeated descriptions will be omitted. The positional relationship such as up, down, left, right is based on the drawings unless otherwise specified. In addition, the dimensional proportions are not limited to those shown in the drawings. Although the following embodiments are used to describe the present invention, the spirit of the present invention is not limited to these embodiments.

Figure 1:
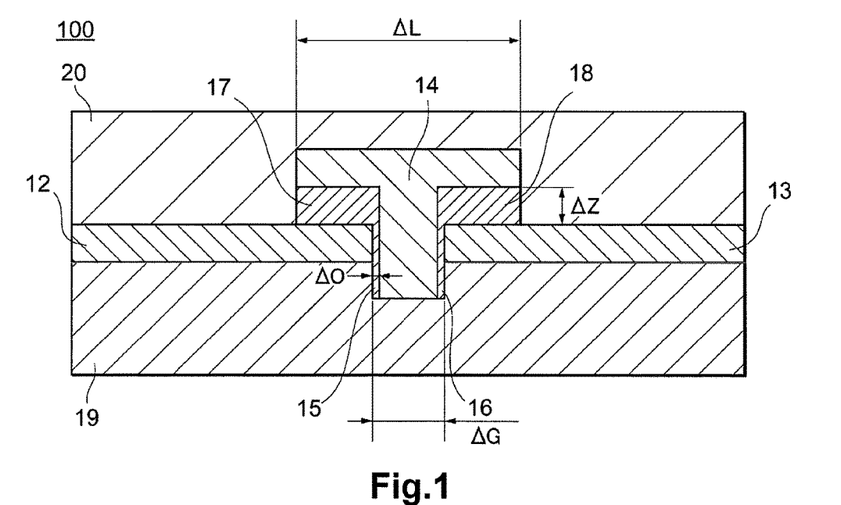
FIG. 1 is a sectional view schematically showing the ESD protection device 100 in the present embodiment. This section is obtained by cutting the discharge electrodes 12 and 13 and the second insulating layers 17 and 18 which are all formed on the first insulating substrate from the center.

FIG. 1 is a sectional view schematically showing the ESD protection device 100 in the present embodiment.

The ESD protection device 100 is provided with an insulating laminate, a pair of rectangular discharge electrodes 12 and 13, a first insulating layer 15 and 16, a second insulating layer 17 and 18, a discharge inducing section 14, and terminal electrodes (not shown in the figure) electrically connected to the discharge electrodes 12 and 13. In particular, the insulating laminate contains a first insulating substrate 19 and a second insulating substrate 20 laminated there. The pair of rectangular discharge electrodes 12 and 13 are disposed between the first and the second insulating substrates and each at least has a side surface and a main surface, and said side surfaces are disposed by setting a gap distance $\Delta G$. The first insulating layer 15 and 16 is disposed on said side surface of the first or the second discharge electrode and contains glass. The second insulating layer 17 and 18 is disposed on said main surface of the first or the second discharge electrode and contains glass. The discharge inducing section 14 is disposed between said side surface of the first discharge electrode and said side surface of the second discharge electrode via the first insulating layers, and at least part of the discharge inducing section is disposed to overlap with said main surfaces of the first and second discharge electrodes via the second insulating layers. The discharge inducing section is composed of a porous substance where the microscopic voids discontinuously distribute and contains a hollow construction having at least one hollow space. The ESD protection device 100 is prepared by a stacking process to embed the pair of discharge electrodes 12 and 13 between the first insulating substrate 19 and the second insulating substrate 20. Further, the ESD protection device 100 is configured as follows. In particular, the discharge electrodes 12 and 13 are electrically connected to the external circuit through the terminal electrodes, and the discharge inducing section 14 functions as the ESD protection material capable of discharging even at a relatively low voltage. In this way, the initial discharge was ensured between the discharge electrodes 12 and 13 by the discharge inducing section 14 when an overvoltage of the static electricity is applied externally.

The size, the shape or the number of the laminated layers of the insulating laminate will not be particularly restricted as long as the insulating laminate having laminated first insulating substrate 19 and second insulating substrate 20 is an insulating laminate at least capable of supporting the discharge electrodes 12 and 13 and the discharge inducing section 14. Here, in addition to the substrate composed of the insulating material, the insulating laminate also contains an insulating film formed on part or the whole surface of the substrate. The substrate can also be a conductive substrate with its surface covered with an insulating film.

The specific example of the insulating laminate can be, for example, a ceramic substrate using a material with a low dielectric constant of 50 or less and preferably 20 or less such as $Al_2O_3$, $SiO_2$, MgO, AlN, $Mg_2SiO_4$ (forsterite) or the like.

On the insulating surface of the first insulating substrate 19, a pair of discharge electrodes 12 and 13 is disposed to be separated from each other. In the present embodiment, the pair of discharge electrodes 12 and 13 is disposed in such a manner that the gap distance $\Delta G$ is set in the first insulating substrate 19. Here, the gap distance $\Delta G$ refers to the shortest distance to connect said side surface of the discharge electrode 12 and said side surface of the discharge electrode 13. In particular, the first insulating substrate is slowly polished from the exterior to expose the interface between the first insulating substrate and each of the discharge electrodes 12 and 13, and the shortest distance between these discharge electrodes is set under an electron microscope to be the gap distance $\Delta G$.

As the material for forming the discharge electrodes 12 and 13, at least one metal selected from the group consisting of C, Ni, Al, Fe, Cu, Ti, Cr, Au, Ag, Pd and Pt or the alloy derived from these metals can be listed. Actually, the material is not particularly restricted. In addition, in the present embodiment, the discharge electrodes 12 and 13 are formed to be rectangular in the top view like after mentioned FIG. 2. However, the shape is not particularly restricted, and the discharge electrodes can also be comb-like or zigzag.

The gap distance $\Delta G$ between the discharge electrodes 12 and 13 is 40 μm or less, preferably 5 to 40 μm, and more preferably 8 to 30 μm. When $\Delta G$ is less than 5 μm, the initial IR tends to decrease. When $\Delta G$ is higher than 40 μm, the peak voltage increases so that no sufficient effect on ESD protection can be provided in practice.

The thickness of discharge electrodes 12 and 13 is preferred to be 4 μm to 25 μm. If the thickness goes beyond the range, the construction defect will frequently occur and the fluctuation in electrical properties may slightly increase.

The method for preparing the discharge electrodes 12 and 13 is not particularly restricted, and the well known means can be properly selected. In particular, there are the methods for forming the discharge electrodes 12 and 13 with a desired thickness on the first insulating substrate 19 such as the coating method, the pattern transferring method, the electroplating method, the electroless plating, the evaporation or the sputtering. In addition, the shape or the gap distance $\Delta G$ of the discharge electrodes 12 and 13 can be processed (adjusted) by some well known methods such as the ion milling, etching, laser processing and dicing. Also, the electrode layer can be formed on the substrate by screen printing with the use of a plate for patterning the gap distance between the discharge electrodes 12 and 13. Thereafter, a firing process is performed to form the discharge electrodes 12 and 13. Alternatively, the devices can be formed by a staking process with the use of a material where the electrode layer is formed on a green sheet composed of an insulating substance through screen printing.

In the material for forming the insulating layers 15, 16, 17 and 18 (the first insulating layer 15, 16 and the second insulating layer 17, 18) which cover the discharge electrodes 12 and 13, the silicate based glass and the aluminosilicate based glass can be listed as the glass. However, no particular restriction is posed there. If the insulation property is to be considered, the components as the glass preferably contain at least selected from the group consisting of $SiO_2$, $Al_2O_3$, $B_2O_3$, MgO, CaO, SrO, BaO, $Li_2O$, $Na_2O$, $K_2O$, ZnO and $ZrO_2$. Preferably, such components contain at least one selected from the group consisting of silicate based glass, aluminosilicate based glass, borate based glass, borosilicate based glass, soda-lime glass, phosphate based glass, plumbate based glass and other inorganic acid salt based glasses. These compounds can be used alone or two or more of them can be used in combination.

The ratio occupied by the glass contained in the insulating layers 15, 16, 17 and 18 is preferably 10 wt % or more and 100 wt % or less. An insulating layer having glass in the range mentioned above will effectively function as one covering the discharge electrodes as it is excellent in insulation property, the compactness and the adhesion to the discharge electrodes. As a result, an ESD protection device excellent in durability against repeated uses can be provided.

The material other than glass for forming the first and second insulating layers 15, 16, 17 and 18 which cover the discharge electrodes 12 and 13 can be the metallic oxide, the metallic nitride or the carbide, wherein $Al_2O_3$, SrO, CaO, BaO, $TiO_2$, $SiO_2$, ZnO, $In_2O_3$, NiO, CoO, $SnO_2$, $V_2O_5$, CuO, MgO and $ZrO_2$ are preferably used as the metallic oxide, AlN and BN are preferred as the metallic nitride, and the carbide can be SiC or the like. These compounds can be used alone. Alternatively, two of them can be used in combination.

The "insulating layer" in the specification does not necessarily have a compact structure. It can also be a mesh-like insulating layer or an insulating layer with spots. The insulating layer can also be formed as particles or particle congeries made of an insulating inorganic material, and the properties are not particularly restricted.

Here, the insulating inorganic material contained in the insulating layers 15, 16, 17 and 18 preferably have a resistivity of $10^6 \Omega m$ or more if an ESD protection device 100 excellent in durability against repeated uses and the discharge properties is to be well reproduced.

The configuration (positional relation) of the pair of discharge electrodes 12 and 13 is not particularly restricted. The positional relation can be, for example, one in which the two discharge electrodes are disposed on the same plane inside the insulating laminate.

It is preferable that the pair of discharge electrodes both have the first insulating layer 15, 16.

The thickness of the first insulating layer 15, 16 away from the surface of the discharge electrode 12, 13 is preferably 0.01 μm or more and 10 μm or less. In this case, the interface, between the first insulating substrate 19 and the discharge electrode 12, is connected to the interface, between the first insulating substrate 19 and the discharge electrode 13, in a straight line with the shortest distance. The thickness of the first insulating layer 15 or 16 is measured in a direction parallel to the mentioned straight line, and the obtained average is used as the thickness ΔO of the first insulating layer. Thereby, the durability against repeated uses will be improved.

The thickness of the second insulating layer 17 or 18 away from the discharge electrode 12 or 13 (i.e., the thickness of the second insulating layer) ΔZ is preferably 3 μm or more and 35 μm or less. In this case, the interface, between the second insulating layer 17 and the discharge electrode 12, is connected to the interface, between the second insulating layer 18 and the discharge electrode 13, in a straight line with the shortest distance, and the thickness of the second insulating layer 17 or 18 in a direction perpendicular to the mentioned straight line is deemed as the thickness ΔZ of the second insulating layer. Thereby, the durability against repeated uses will be improved.

The method for forming the first insulating layer 15, 16 and the second insulating layer 17, 18 is not particularly restricted, and the well-known method for film formation can be used. If a discharge inducing section 14 with good performance is to be well reproduced, a method is preferable in which the mixture of the insulating inorganic materials for forming the insulating layers mentioned above is coated on the surface of the discharge electrode and then a firing process is provided. Hereinafter, the preferable method for forming the first insulating layer 15, 16 and the second insulating layer 17, 18 will be described.

In this method, a mixture containing at least the insulating inorganic materials mentioned above is prepared and the mixture is formed on the discharge electrodes 12 and 13 and the gap between them through coating or printing to cover the surfaces of the discharge electrodes 12 and 13. Thereafter, the mixture for forming the insulating layer disposed in the gap is removed by laser irradiation to have a desired thickness for the insulating layer. Thereby, the insulating layer which covers the electrode section is provided as well as a space for forming the discharge inducing section. Further, the space for forming the discharge inducing section can be provided by some well-known methods such as ion milling, etching, laser processing and dicing. When the mixture is being prepared or the mixture is being coated or printed, various additives such as the solvent or the binder can be added. In addition, the conditions during the firing treatment are not particularly restricted. However, if the productivity and the economic issue are to be considered, the firing treatment is preferably performed in air at 500 to 1200° C. for 10 minutes to 5 hours.

Figure 2:
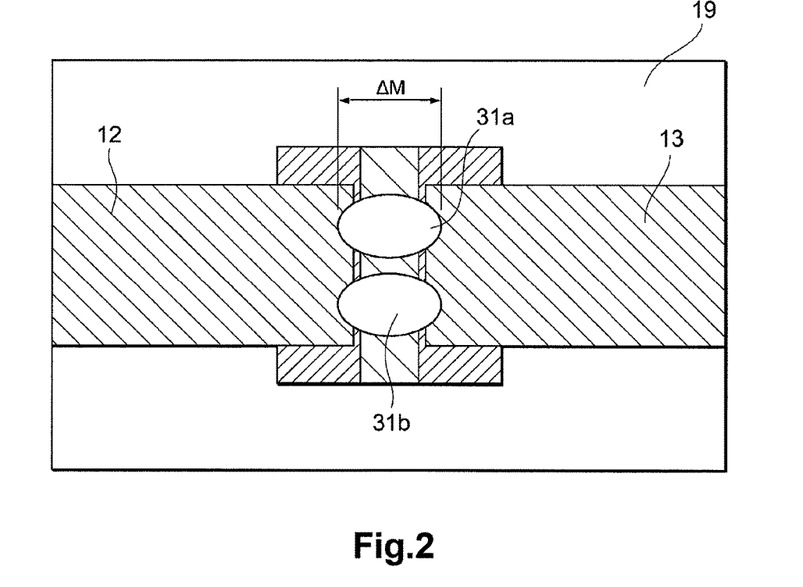
FIG. 2 is a sectional view schematically showing the ESD protection device 100 in the present embodiment. This section is obtained by cutting at the interface between the discharge electrodes 12 and 13 and the second insulating layers 17 and 18.

In the present embodiment, the discharge inducing section 14 is composed of a composite in which the insulating inorganic material and the conductive inorganic material are dispersed. In addition, the discharge inducing section has a construction where microscopic voids discontinuously distribute and is also provided with a hollow construction with at least one hollow space 31a, 31b. FIG. 2 is a sectional view schematically showing the section of the ESD protection device 100 in the present embodiment cut along the interface between the discharge electrode 12, 13 and the second insulating layer 17, 18. Here, the discharge electrode 12, 13 is disposed with its front end portion protruding from the hollow space 31a, 31b. The discharge inducing section 14 is a composite where microscopic voids, the insulating inorganic material and the conductive inorganic material distribute. The discharge inducing section has a hollow construction and also a construction in which microscopic voids discontinuously distribute.

The microscopic voids make the discharge inducing section 14 porous so as to absorb the heat or stress generated by discharge and to buffer the disruption caused by the melting and deformation of the electrodes 12, 13 and the surrounding matters. Here, the microscopic void in the present specification refers to the space with a size of 0.1 to 5 μm. In addition, the size of the microscopic void in this specification refers to the median particle size (D50) of a spherical space having an aspect ratio of 1 to 5 in the discharge inducing section 14 when observed in any section. If the microscopic void has other shapes, the size refers to arithmetic mean of the major axis and the minor axis and the average of randomly selected 50 points is used as the size. The size of the microscopic void or the volume ratio of the microscopic voids to the discharge inducing section 14 can be properly set in accordance with the desired electrostatic adsorption property, durability against repeated discharges and prevention of short-circuiting between electrodes 12 and 13. Although not particularly restricted, the size of the microscopic void is preferably 0.1 to 2 µm. In addition, the microscopic voids are preferably contained in the discharge inducing section 14 with a ratio of 1 to 40 vol %, and more preferably 5 to 20 vol %.

The number of the hollow spaces in the discharge inducing section 14 is not particularly restricted. In the present embodiment, the hollow structure with two hollow spaces 31a and 31b is used. However, the number of the hollow spaces is not restricted in specific and can even be only one or several. As the hollow space increases in number, the discharge frequency relative to one hollow space decreases. Thus, the durability against repeated uses will be further improved. Further, when a plurality of section hollows are disposed, the shape and/or size can be the same or different in the hollow space.

The shape of the hollow space 31a, 31b is not particularly restricted either. For example, any shape can be employed such as the sphere and ellipsoid-like shape, and the hollow space can also be in an indefinite shape. Especially, the hollow spaces 31a and 31b are preferred to be in a shape extending in a direction that the electrodes 12 and 13 are connected. With such hollow spaces 31a and 31b, the discharge generated between electrodes 12 and 13 is performed along the plane of the hollow space. Thus, the deterioration of the discharge inducing section becomes less and the durability is improved. Further, the fluctuation of the peak voltage or the discharge starting voltage can be inhibited.

Figure 3:
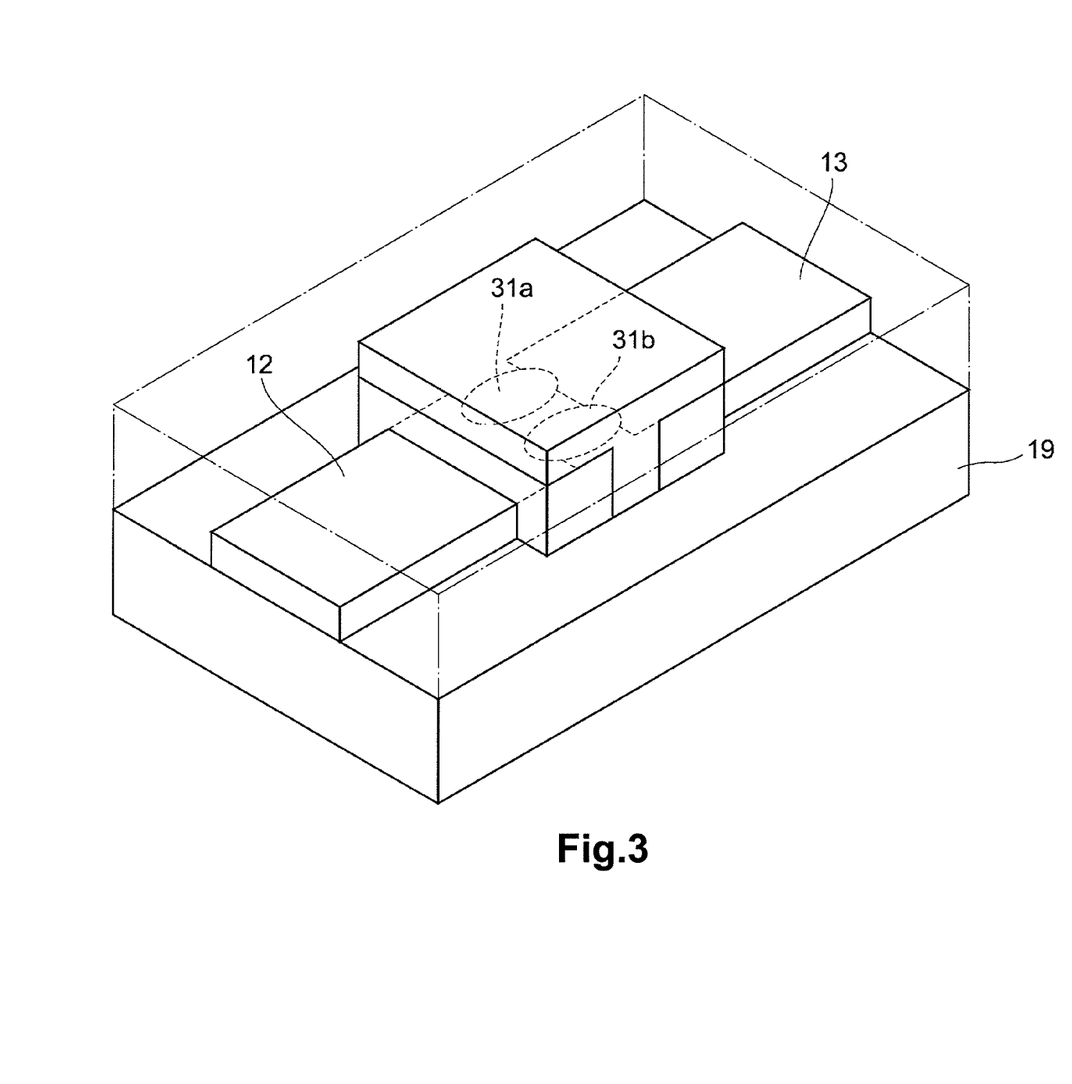
FIG. 3 is a stereogram schematically showing the structure inside the ESD protection device 100 in the present embodiment.

In another respect, the size of the hollow space 31a, 31b is not particularly restricted. However, if the disruption due to discharges is to be inhibited and the durability is to be improved, as shown in FIG. 2, the length ΔM of the hollow space 31a, 31b in a direction that the electrodes 12 and 13 are connected preferably ranges from a half of the gap distance ΔG between electrodes 12 and 13 to a level less than the length ΔL of the discharge inducing section 14 (i.e., ΔL in FIG. 1). In addition, the length of the hollow space 31a, 31b in a direction that the electrodes 12 and 13 are connected refers to the longest length of the hollow space 31a, 31b in a direction that the electrodes 12 and 13 are connected. In specific, the insulating substrate is slowly polished from the exterior to expose the hollow spaces 31a and 31b, and then the longest length of the hollow space 31a, 31b is measured under an electron microscope. The length of the discharge inducing section 14 refers to the longest length of the discharge inducing section 14 in a direction that the electrodes 12 and 13 are connected. For example, when an ESD protection device is prepared to have a gap distance ΔG of about 10 to 20 µm, the length of the hollow space 31a, 31b in a direction that the electrodes 12 and 13 are connected is about 5 to 10 µm which is shorter than the length of the discharge inducing section 14. FIG. 3 is a stereograph schematically showing the internal construction of the ESD protection device 100. As shown in FIG. 2 and FIG. 3, the length of the hollow space 31a, 31b in a direction the electrodes 12 and 13 are connected is set to be the gap distance ΔG between electrodes 12 and 13 or more so that the front end portion of the electrode 12, 13 exposes to the hollow space 31a, 31b. In this respect, the damage to the discharge inducing section due to the discharge between electrodes 12 and 13 can be inhibited. Thus, the deterioration of the discharge inducing section becomes less and the durability is improved. Further, the fluctuation of the peak voltage or the discharge starting voltage can be inhibited.

Hereinafter, the preferable method for forming the discharge inducing section 14 will be described. First of all, a mixture containing the insulating inorganic material and the conductive inorganic material is prepared and then formed in the gap between the electrodes 12 and 13 by a method such as coating or printing. Then, the paste-like mixture for forming the hollow spaces 31a and 31b are disposed in a desired shape in a specified position above the mixture supplied to the gap between the electrodes 12 and 13 by coating or printing. Thereafter, if needed, the mixture can be further disposed by coating or printing in a specified position above the paste for forming the discharge inducing section. Then, a firing process is provided so as to thermally decomposed the removable material or make the removable material volatilize until the material disappear. In this way, the removable material is removed during the firing process so as to provide a discharge inducing section 14 having the hollow space 31a, 31b with a desired shape formed in the desired position. Here, the condition during the firing process is not particularly restricted. If the productivity and the economical issue are to be considered, the firing process is preferably done in air at 500 to 1200° C. for 10 minutes to 5 hours.

Furthermore, these is no particular restriction on the removable material used in the method mentioned above as long as this material will be thermally decomposed or volatilize and then disappear during the firing process. Well known materials can be appropriately selected. The specific examples of such removable materials can be, for example resin particles or a mixture of a solvent and resins (i.e., the resin paste) but the material is not particularly limited thereto. The representative resin particle can be a resin particle with an excellent thermal decomposability such as acrylic resins. Further, the shape of the resin particle is not particularly restricted and can be any one of the hammer-like shape, the column-like shape, the sphere-like shape with an aspect ratio of 1 to 5, the ellipsoid-like shape with an aspect ratio above 5 or an indefinite shape. Also, the representative resin paste can be, for example, a kind of resin that is thermally decomposed or volatilize or disappear during the firing process, or a mixture obtained by mixing the acrylic resin, ethyl cellulose and polypropylene in a well known solvent.

Further, in the present specification the particle size of the resin particle refers to the median particle size (D50) of a spherical article or the arithmetic mean of the major axis and the minor axis in an article with other shapes.

During the preparation of the mixture, various additives such as the solvent or the binder can be added. In addition, various additives such as the solvent, the binder or the like can be added when the mixture is coated or printed. When the resin paste is used to prepare the hollow spaces 31a and 31b, the concentration of the solid components, the viscosity and the like of the resin paste are properly adjusted to provide the hollow space 31a, 31b with the desired shape and size. Further, when the resin paste is prepared or when the resin paste is coated or printed, various additives such as the solvent, the surfactant, the thickener or the like can be added. On the other hand, a constructed body which is composed of the resin or fiber capable of being thermally decomposed or volatilizing or disappearing during the firing process and also has a shape in accordance with the hollow space 31a, 31b with a desired shape and size can be used in stead of the removable material or used together with the removable material to prepare the hollow space 31a, 31b.

In another method for preparing the hollow space 31a, 31b, a high voltage may be applied in advance and then the hollow space 31a, 31b is formed inside the discharge inducing section as the discharge proceeds. When the hollow space 31a, 31b is formed by such a method, as shown in FIG. 2, the front end portion of the discharge electrode 12, 13 can be provided with a structure having a concaved part.

In the discharge inducing section composed of the conductive inorganic material and the insulating inorganic material, in order to form the microscopic voids, an insulating inorganic material that will not be sintered at a temperature where the insulating laminate is fired is used as the insulating inorganic material. The insulating inorganic material will not be sintered at the temperature where the insulating laminate is fired, so microscopic voids are formed between the particles of the insulating inorganic material. On the other hand, as the insulating inorganic material forming the discharge inducing section will not shrink due to the firing process, the agglutination can be avoided when the conductive inorganic material is fired and the circuit can be prevented from being short.

In the discharge inducing section composed of the conducting inorganic material and the insulating inorganic material, the conductive inorganic material is contained in an amount of 20 vol % or more and 90 vol % or less. When the insulating layer containing glass covers the discharge electrode, the ratio of conductive inorganic material contained in the discharge inducing section can be increased, improving the discharge properties. In the ESD protection device with the structure mentioned above, the conductive inorganic materials in the discharge electrode and the discharge inducing section can be prevented from being connected from each other during the firing process in the preparation of the components by covering the discharge electrodes with a high condensed insulating layer. These results suggest that the ratio occupied by the conductive inorganic material can be increased in the discharge inducing section and the discharge properties can be improved.

The specific examples of the conductive inorganic material forming the discharge inducing section can be, for example, the metal, the alloy, the metallic carbide, the metallic boride or the like but is not particularly limited thereto. If the electrical conductivity is to be considered, C, Ni, Al, Fe, Cu, Ti, Cr, Au, Ag, Pd and Pt or the alloy of these metals are preferable.

The specific example of the insulating inorganic material forming the discharge inducing section can be, for example, the metallic oxide, the metallic nitride such as AlN and the like. However, the material is not limited thereto. If the insulation properties or the costs are to be considered, $Al_2O_3$, SrO, CaO, BaO, $TiO_2$, $SiO_2$, ZnO, $In_2O_3$, NiO, CoO, $SnO_2$, $Bi_2O_3$, $Mg_2SiO_4$, $V_2O_5$, CuO, MgO, $ZrO_2$, $Mg_2SiO_4$, AlN, BN and SiC are preferable. There compounds can be used alone. Alternatively, two or more of them can be used in combination. The insulating inorganic material can be formed either as an uniform film or a particle agglomeration, and the characters are not particularly restricted. Among those, $Al_2O_3$, $SiO_2$ $Mg_2SiO_4$ or the like are more preferable from the viewpoint of good insulation properties.

The thickness of the discharge inducing section 14 is not particularly restricted and can be appropriately set. In specific, the thickness is preferably 10 nm to 60 µm, and more preferably 100 nm to 50 µm. The interface between the discharge inducing section 14 and the second insulating layer 17 is connected to the interface between the discharge inducing section 14 and the second insulating layer 18 in a straight line with the shortest distance, and the thickness of the discharge inducing section 14 in a direction perpendicular to this straight line is used as the thickness of the discharge inducing section.

Preferably, the discharge inducing section 14 is in a shape that it protrudes to the first insulating substrate 19 and the second insulating substrate 20 in such a manner that the longest length protruding to the insulating substrate is ⅛ or more of the thickness of the oppositely disposed two discharge electrodes. The longest length protruding to the insulating substrate refers to the length of the discharge inducing section 14 in a direction, that intersects perpendicularly the line with the interfaces between each oppositely disposed discharge electrode and its respective insulating substrate as the base points, at the middle of the gap distance ΔG between the discharge electrodes 12 and 13 shown in FIG. 1. The shape is preferably set to have a length that is ⅛ or more of the thickness of the oppositely disposed discharge electrodes. With such a shape having a protruding part of one eighth or more of the length of the thickness of the discharge electrode, the intensity variations of the electric field can be decreased at the corners of the electrode so as to further eliminate the fluctuation in discharge properties. In addition, the shape of the protruding part is not particularly restricted but either one of the protruding parts on both sides preferably keeps a shape such as a wedge-like shape, semicircle or quadrangle toward the side where the insulating substrate locates to cover the corner of the electrode. As a result, the fluctuation in discharge properties will be improved.

Various modifications are possible without departing from the spirit of the present invention, and the present invention is not limited to the foregoing embodiments.

EXAMPLES

The embodiments of the present invention will be described with reference to the drawings of the Examples and Comparative Examples (FIG. 1 to FIG. 4).

First of all, the influence of the presence of the insulating layer or the different type of the insulating inorganic material contained in the insulating layer on the durability against repeated uses was tested.

Example 1

First of all, a green sheet obtained by making the materials consisting of the main component $Al_2O_3$ and the glass component into a sheet was prepared as an insulating laminate. An Ag paste was printed with a thickness of 13 µm on one surface of the green sheet through screen printing so as to form a strip-like electrode pattern. The width of the printed electrode was 0.4 mm. Then, a cutting process was provided to the middle part of the strip-like electrodes through the YAG laser to form a pair of discharge electrodes 12 and 13. The process was performed with the processing depth, from the lower surface of each oppositely disposed electrode 12, 13 to a fired first insulating substrate 19, being at least 10 µm and the gap distance ΔG between the discharge electrodes 12 and 13 was 20 µm.

Then, a first insulating layer 15, 16 and a second insulating layer 17, 18 were formed in the following sequence on the first insulating substrate 19 and the discharge electrodes 12 and 13. Firstly, the aluminosilicate based glass with $Al_2O_3$, $SiO_2$ and SrO as the main components was used in the insulating inorganic material. The ethyl cellulose based resin as the binder was mixed with terpineol as the solvent to prepare a lacquer with a solid concentration of 8 wt %.

Next, the lacquer was added to and mixed with the glass so as to prepare the paste of insulating inorganic material. Then, the obtained paste mixture was coated through screen printing to cover the insulating surface of the first insulating substrate 19 and part of the surface of the discharge electrode 12, 13 with the thickness of the second insulating layer 17, 18 after the firing process being 15 μm. Thereby, a cutting process was provided to the middle part of the gap between electrodes by YAG laser in such a manner that the thickness of the first insulating layer from the surface of the discharge electrode is 2 μm so as to form the insulating layer.

Thereafter, the acrylic resin was mixed into the butyl carbitol, and a paste-like mixture with a solid concentration of 40 mass % was prepared for the preparation of hollow spaces 31a and 31b which were positioned as shown in FIG. 2. Then, the discharge inducing section 14 was formed on the first insulating substrate 19 and the second insulating layer 17, 18 as follows. First, $Al_2O_3$ with an average particle size of 1 μm (trade name: AM-27, prepared by Sumitomo Chemical Co., Ltd) was weighed as the insulating inorganic material to occupy 80 vol % of the volume, and Ag particles with an average size of 1 μm (trade name: SPQ05S, prepared by Mitsui Kinzoku Co., Ltd) was weighed as the conductive inorganic material to occupy 20 vol % of the volume. They were mixed to provide a mixture. On the other hand, the ethyl cellulose based resin as the binder was mixed with terpineol as the solvent to prepare a lacquer with a solid concentration of 8 mass %. Then, the lacquer was added to and mixed with the mixture obtained above to prepare the paste for the discharge inducing section.

Then, the obtained paste-like mixture was coated by screen printing to be embedded into the gap between the first insulating layers 15 and 16 so as to form a layer of mixture (the precursor of the discharge inducing section 14). The green sheet was stacked on the layer of mixture to provide a laminate by hot pressing. After that, the obtained laminate was cut into individual pieces with a specified size. Then, the individual pieces of laminate were subjected to an hour of thermal treatment (treatment of binder removal) at 200° C. Then, the temperature was raised with a rate of 10° C./min and the individual pieces of laminate were kept in air at 950° C. for 30 minutes to provide a sintered body. After the firing process, the gap distance ΔG between the pair of discharge electrodes 12 and 13 became 20 μm with a thickness of 10 μm. In addition, the thickness of the insulating layer 15, 16 away from the surface of the discharge electrode became 1 μm and the thickness of the insulating layer 17, 18 away from the surface discharge electrode became 15 μm.

Then, a terminal electrode with Ag as the main component was formed to be connected to the exterior end portions of the discharge electrodes 12 and 13. In this way, the ESD protection device 100 of Example 1 was obtained.

Example 2

An ESD protection device was prepared in Example 2 as in Example 1 except the second insulating layer 17, 18 after the firing process was adjusted by changing the condition in screen printing to have a thickness of 5 μm.

Example 3

An ESD protection device was prepared in Example 3 as in Example 1 except the second insulating layer 17, 18 after the firing process was adjusted by changing the condition in screen printing to have a thickness of 34 μm.

Comparative Example 1

An ESD protection device was prepared in Comparative Example 1 as in Example 1 except the second insulating layer 17, 18 after the firing process was adjusted by changing the condition in screen printing to have a thickness of 2 μm.

Comparative Example 2

An ESD protection device was prepared in Comparative Example 2 as in Example 1 except the second insulating layer 17, 18 after the firing process was adjusted by changing the condition in screen printing to have a thickness of 40 μm.

Example 4

An ESD protection device was prepared in Example 4 as in Example 1 except the gap distance ΔG after the firing process was adjusted to 40 μm and the second insulating layer 17, 18 after the firing process was adjusted to have a thickness of 3 μm by changing the condition in screen printing.

Example 5

An ESD protection device was prepared in Example 5 as in Example 1 except the gap distance ΔG after the firing process was adjusted to 40 μm and the second insulating layer 17, 18 after the firing process was adjusted to have a thickness of 34 μm by changing the condition in screen printing.

Comparative Example 3

An ESD protection device was prepared in Comparative Example 3 as in Example 1 except the gap distance ΔG after the firing process was adjusted to 40 μm and the second insulating layer 17, 18 after the firing process was adjusted to have a thickness of 1 μm by changing the condition in screen printing.

Comparative Example 4

An ESD protection device was prepared in Comparative Example 4 as in Example 1 except the gap distance ΔG after the firing process was adjusted to 40 μm and the second insulating layer 17, 18 after the firing process was adjusted to have a thickness of 1 μm by changing the condition in screen printing.

Example 6

An ESD protection device was prepared in Example 6 as in Example 1 except that the condition in the processing with YAG laser was adjusted in such a manner that the processing depth of the first insulating substrate 19 after the firing process became 0 μm.

Example 7

An ESD protection device was prepared in Example 7 as in Example 1 except that the processing was adjusted to use femtosecond laser which has a spot diameter smaller than that of YAG laser in such a manner that the gap distance ΔG after the firing process became 5 μm.

Comparative Example 5

An ESD protection device was prepared in Comparative Example 5 as in Example 1 except the gap distance ΔG after the firing process was adjusted by changing the condition in screen printing to 50 μm.

<Electrostatic Discharge Test>

Figure 4:
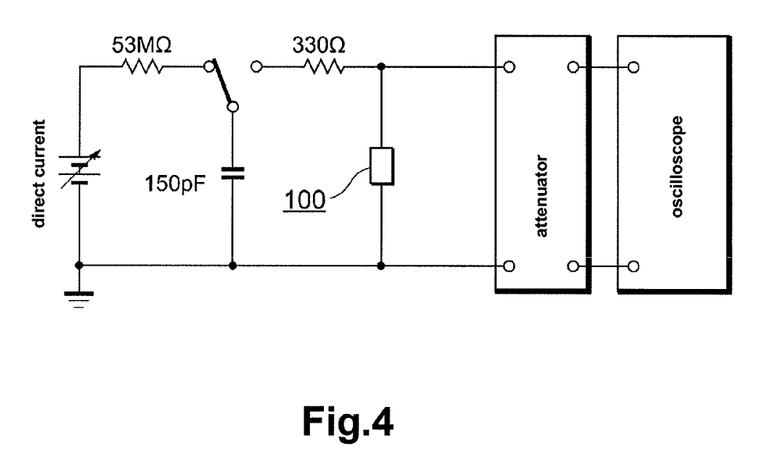
FIG. 4 is a circuit diagram of the ESD discharge test.

The electrostatic discharge test was performed for the ESD protection devices of Examples 1 to 6 and Comparative Examples 1 to 4 obtained above by using the circuit for electrostatic discharge test shown in FIG. 4. The test results were shown in Table 1.

The electrostatic discharge test was carried out based on the human body model (discharge resistance was 330Ω, discharge capacitance was 150 pF, applied voltage was 8.0 kV, contact discharge) following the IEC61000-4-2 electrostatic discharge immunity test and the noise test. In particular, as shown in the circuit for electrostatic test in FIG. 4, one terminal electrode of the ESD protection device as the evaluation subject was connected to the ground while the other terminal electrode was connected to the electrostatic pulse applying portion so that the electrostatic pulses were applied when the electrostatic pulse applying portion contacted the discharge gun. Ten samples were prepared for each electrostatic discharge test, and the electrostatic discharge test was done in each sample for 1000 times with a voltage of 8.0 kV. The discharge properties were assessed according to the peak voltage in the first discharge test. Further, the discharge durability was assessed according to the $1000^{th}$ peak voltage, the electrostatic capacitance (Cp) and IR properties.

TABLE 1

| | Length of Gap ΔG (μm) | Thickness of electrode (μm) | Thickness of second insulating layer ΔZ (μm) | Property at initial stage | | | Discharge durability (8 kV, after 1000 times) | | |
|---|---|---|---|---|---|---|---|---|---|
| | | | | Cp (pF) | Peak voltage | IR | Cp (pF) | Peak voltage | IR |
| Example 1 | 20 | 10 | 15 | 0.15 | 309 V | $10^{10}\,\Omega$ | 0.17 | 301 V | $10^{8}\,\Omega$ |
| Example 2 | 20 | 10 | 5 | 0.15 | 289 V | $10^{11}\,\Omega$ | 0.19 | 299 V | $10^{6}\,\Omega$ |
| Example 3 | 20 | 10 | 34 | 0.16 | 342 V | $10^{10}\,\Omega$ | 0.19 | 346 V | $10^{7}\,\Omega$ |
| Comparative Example 1 | 20 | 10 | 2 | 0.15 | 308 V | $10^{10}\,\Omega$ | 0.17 | 359 V | $10^{3}\,\Omega$ |
| Comparative Example 2 | 20 | 10 | 40 | 0.16 | 302 V | $10^{11}\,\Omega$ | 0.17 | 351 V | $10^{9}\,\Omega$ |
| Example 4 | 40 | 10 | 3 | 0.12 | 561 V | $10^{11}\,\Omega$ | 0.14 | 591 V | $10^{6}\,\Omega$ |
| Example 5 | 40 | 10 | 34 | 0.13 | 539 V | $10^{11}\,\Omega$ | 0.14 | 502 V | $10^{9}\,\Omega$ |
| Comparative Example 3 | 40 | 10 | 1 | 0.12 | 498 V | $10^{10}\,\Omega$ | 0.13 | 630 V | $10^{5}\,\Omega$ |
| Comparative Example 4 | 40 | 10 | 40 | 0.13 | 582 V | $10^{11}\,\Omega$ | 0.14 | 645 V | $10^{9}\,\Omega$ |
| Example 6 | 20 | 10 | 15 | 0.16 | 334 V | $10^{10}\,\Omega$ | 0.18 | 312 V | $10^{8}\,\Omega$ |

The fluctuation of electrical properties (σ) was assessed under the same experimental condition. One hundred copies were prepared for each sample to perform the electrostatic discharge test. The lower limit was problematic with respect to the IR properties so the minimal value (Min.) was recorded.

TABLE 2

| | Length of Gap ΔG (μm) | Thickness of electrode (μm) | Thickness of second insulating layer ΔZ (μm) | Property at initial stage | | | | | | Discharge durability (8 kV, after 1000 times) | | | | | |
|---|---|---|---|---|---|---|---|---|---|---|---|---|---|---|---|
| | | | | Cp (pF) | | Peak voltage (V) | | IR | | Cp (pF) | | Peak voltage (V) | | IR | |
| | | | | Ave. | σ | Ave. | σ | | Min. | Ave. | σ | Ave. | σ | | Min. |
| Example 1 | 20 | 10 | 15 | 0.15 | 0.007 | 304 | 28 | | $10^{10}\Omega$ | 0.17 | 0.008 | 299 | 52 | | $10^{7}\Omega$ |
| Example 2 | 20 | 10 | 5 | 0.15 | 0.010 | 288 | 19 | | $10^{10}\Omega$ | 0.19 | 0.007 | 291 | 76 | | $10^{6}\Omega$ |
| Example 3 | 20 | 10 | 34 | 0.16 | 0.015 | 351 | 48 | | $10^{10}\Omega$ | 0.19 | 0.019 | 435 | 141 | | $10^{7}\Omega$ |
| Comparative Example 1 | 20 | 10 | 2 | 0.15 | 0.009 | 296 | 22 | | $10^{10}\Omega$ | 0.17 | 0.009 | 380 | 97 | | $10^{3}\Omega$ |

TABLE 2-continued

| | Length of Gap | Thickness of electrode | Thickness of second insulating layer ΔZ | Property at initial stage | | | | | Discharge durability (8 kV, after 1000 times) | | | | | |
|---|---|---|---|---|---|---|---|---|---|---|---|---|---|---|
| | ΔG (μm) | (μm) | (μm) | Cp (pF) | | Peak voltage (V) | | IR | Cp (pF) | | Peak voltage (V) | | IR | |
| | (μm) | (μm) | (μm) | Ave. | σ | Ave. | σ | Min. | Ave. | σ | Ave. | σ | Min. |
| Comparative Example 2 | 20 | 10 | 40 | 0.16 | 0.016 | 341 | 101 | $10^{11}\Omega$ | 0.17 | 0.021 | 432 | 228 | $10^{2}\Omega$ |
| Example 4 | 40 | 10 | 3 | 0.12 | 0.011 | 512 | 22 | $10^{10}\Omega$ | 0.14 | 0.009 | 565 | 95 | $10^{6}\Omega$ |
| Example 5 | 40 | 10 | 34 | 0.13 | 0.012 | 498 | 26 | $10^{11}\Omega$ | 0.14 | 0.013 | 506 | 124 | $10^{5}\Omega$ |
| Comparative Example 3 | 40 | 10 | 1 | 0.12 | 0.007 | 505 | 25 | $10^{10}\Omega$ | 0.13 | 0.008 | 608 | 113 | $10^{4}\Omega$ |
| Comparative Example 4 | 40 | 10 | 40 | 0.13 | 0.013 | 598 | 103 | $10^{10}\Omega$ | 0.14 | 0.028 | 615 | 218 | $10^{2}\Omega$ |
| Example 6 | 20 | 10 | 15 | 0.16 | 0.015 | 329 | 68 | $10^{10}\Omega$ | 0.19 | 0.023 | 344 | 150 | $10^{5}\Omega$ |
| Example 7 | 5 | 10 | 15 | 0.20 | 0.011 | 150 | 29 | $10^{10}\Omega$ | 0.28 | 0.020 | 379 | 72 | $10^{5}\Omega$ |
| Comparative Example 5 | 50 | 10 | 15 | 0.10 | 0.005 | 868 | 51 | $10^{10}\Omega$ | 0.11 | 0.007 | 881 | 63 | $10^{8}\Omega$ |

According to the results listed in Table 1 and Table 2, the ESD protection device in the Examples of the present application had achieved a balance between the peak voltage before and after the discharge durability test and IR decrease when the variation was taken into consideration. Also, the ESD protection device in the Examples was determined to be excellent in durability against repeated uses.

In addition, it was determined from Table 1 that the ESD protection device in Comparative Example 1 had a decreased IR and inferior durability against repeated uses. Thereby, in a device with a short gap distance and a thin second insulating layer, the second insulating layer was broken due to the heat or shock generated during discharge process, suggesting that short-circuiting was likely to occur between discharge electrodes. Here, with respect to the IR decrease confirmed here, a device with an insulation resistance even lower than $1 \times 10^{5}\Omega$ which was generally required was deemed to have a decreased IR.

It was determined the ESD protection devices in Comparative Example 2 and Comparative Example 4 had a large variation in peak voltage, a decreased IR and inferior durability against repeated uses.

The ESD protection device in Comparative Example 3 was also determined to have a high peak voltage, a decreased IR and inferior durability against repeated uses. Thereby in the device with a thin second insulating layer, the second insulation layer was broken due to the heat or shock generated during the discharge process, suggesting that these discharge electrodes were likely to be short.

As described above, the electrostatic discharge protection device of the present invention has improved discharge properties and an improved durability against repeated uses. Also, the discharge properties were improved. Thus, the electrostatic discharge protection device can be widely and effectively used in electric or electrical devices having the electrostatic discharge protection devices of the present invention and various machines, equipments and systems containing these electric or electrical devices.

DESCRIPTION OF REFERENCE NUMERALS 12, 13 discharge electrode
14 discharge inducing section
15, 16 first insulating layer
17, 18 second insulating layer
19 first insulating substrate
20 second insulating substrate
31a hollow space
31b hollow space
100 electrostatic discharge protection device (ESD protection device)

What is claimed is:

1. An electrostatic discharge protection device, comprising
    an insulating laminate containing a first insulating substrate and a second insulating substrate stacked there,
    a first discharge electrode and a second discharge electrode with each having at least a side surface and a main surface, wherein, the first discharge electrode and the second discharge electrode are disposed between the first insulating substrate and the second insulating substrate with the side surfaces being opposite to each other,
    a first insulating layer containing glass which is disposed on the side surfaces of the first discharge electrode and the second discharge electrode,
    a second insulating layer containing glass which is disposed on the main surfaces of the first discharge electrode and the second discharge electrode,
    a discharge inducing section disposed between the side surface of the first discharge electrode and the side surface of the second discharge electrode via the first insulating layer, wherein, at least part of the discharge inducing section is disposed to overlap with the main surfaces of the first discharge electrode and the second discharge electrode via the second insulating layer, and the discharge inducing section is composed of a porous substance with microscopic voids discontinuously distributed and contains a hollow construction containing at least one hollow space,
    when the distance between the side surface of the first discharge electrode and the side surface of the second discharge electrode is set as ΔG, and the thickness of the second insulating layer is set as ΔZ, ΔG and ΔZ satisfy the following in equations, $3~\mu m \leq \Delta Z \leq 35~\mu m$, $\Delta G \leq 40~\mu m$.

2. The electrostatic discharge protection device of claim 1, wherein, the discharge inducing section is in a shape of protruding to the first insulating substrate and the second insulating substrate.

\* \* \* \* \*